United States Patent
Birke et al.

[11] 3,930,793
[45] Jan. 6, 1976

[54] PROCESS FOR THE DYEING OF SYNTHETIC FIBER MATERIALS FROM ORGANIC SOLVENTS

[75] Inventors: Walter Birke; Rudolf Schickfluss; Franz Schon, all of Frankfurt am Main; Willi Steckelberg, Hofheim, Taunus, all of Germany

[73] Assignee: Hoechst Aktiengesellschaft, Frankfurt am Main, Germany

[22] Filed: Oct. 19, 1973

[21] Appl. No.: 408,072

[30] Foreign Application Priority Data
Oct. 21, 1972 Germany............................ 2251703

[52] U.S. Cl.................... 8/41 B; 8/41 R; 8/41 A; 8/41 C; 8/41 D; 8/50; 260/174; 260/189; 260/190; 260/191
[51] Int. Cl.².. C08K 5/23; C09B 43/18; D06P 1/04
[58] Field of Search............ 8/173, 174, 41 A, 41 B, 8/41 C, 41 D, 41 R; 260/174, 189, 190, 191

[56] References Cited
UNITED STATES PATENTS

| | | | |
|---|---|---|---|
| 1,738,978 | 11/1929 | Whitehead............................ | 8/173 X |
| 2,691,027 | 10/1954 | Grossmann et al..................... | 8/6 X |
| 2,888,452 | 5/1959 | Schmid et al........................ | 8/6 X |
| 3,663,161 | 5/1972 | Litzler et al....................... | 8/174 |
| 3,684,431 | 8/1972 | Bischof et al....................... | 8/137 |
| 3,738,803 | 6/1973 | Blanc et al......................... | 8/174 X |

FOREIGN PATENTS OR APPLICATIONS

| | | | |
|---|---|---|---|
| 525,042 | 8/1940 | United Kingdom....................... | 8/6 |
| 1,288,063 | 10/1969 | Germany | |

*Primary Examiner*—Benjamin R. Padgett
*Assistant Examiner*—David Leland
*Attorney, Agent, or Firm*—Curtis, Morris & Safford

[57] ABSTRACT

A process for the continuous dyeing of textile material containing or consisting of synthetic fibers from organic solvents, which comprises impregnating the said textile materials with an organic dyebath containing at least one dyestuff of the formula

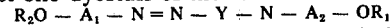

in which $A_1$ and $A_2$ each represent, independently of each other, phenylene, lower alkyl-phenylene, lower alkoxy-phenylene, chlorophenylene, bromophenylene or naphthylene, Y represents phenylene, lower alkyl-phenylene, lower alkoxy-phenylene, di(lower alkyl)-phenylene, di(lower alkoxy)-phenylene, lower alkyl-lower alkoxy-phenylene, chlorophenylene, bromophenylene, biphenylene, di(lower alkyl)-biphenylene, di(lower alkoxy)-bi-phenylene, di(chloro)-biphenylene or di(bromo)-biphenylene, $R_1$ represents a straight chain or branched alkylcarbonyl of at most 18 carbon atoms, benzoyl, lower alkyl-benzoyl, chlorobenzoyl or bromobenzoyl, and $R_2$ represents a straight chain or branched alkylcarbonyl of at most 18 carbon atoms, benzoyl, lower alkyl-benzoyl, chlorobenzoyl, bromobenzoyl or lower alkyl

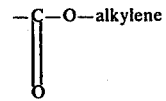

(of 2 to 4 carbon atoms, and an organic solvent and subsequently fixing the dyestuffs by a heat treatment.

8 Claims, No Drawings

PROCESS FOR THE DYEING OF SYNTHETIC FIBER MATERIALS FROM ORGANIC SOLVENTS

We have found that textile materials consisting of, or containing, synthetic fibers can be dyed continuously by impregnating the said textile materials with organic dyeing liquors which contain dyestuffs of the general formula (1)

$$R_2O - A - N = N - B - N = N - C - OR_1 \quad (1)$$

in which A represents represents an arylene radical, for example a phenylene or naphthylene radical, preferably the radical of the formula (2)

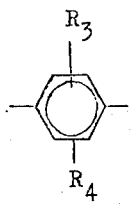

(2)

in which $R_3$ and $R_4$ represent, indenpendently of each other, hydrogen atoms, halogen atoms, preferably chlorine or bromine atoms, or alkyl or alkoxy groups of preferably 1 to 4 carbon atoms, said radical A may be substituted by halogen atoms, preferably chlorine or bromine atoms, or alkyl or alkoxy groups of preferably 1 to 4 carbon atoms, B represents a 1,4-phenylene, 1,4-naphthylene, 4,4'-biphenylene, 4,4-phenylazophenyl or a 4,4'-naphthylazonaphthyl group which may be substituted by halogen atoms, preferably chlorine or bromine atoms, or alkyl or alkoxy groups of preferably 1 to 4 carbon atoms, C represents an arylene radical, for example a phenylene or naphthylene radical, preferably the radical of the formula (3)

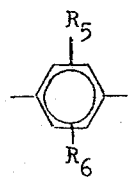

(3)

in which $R_5$ and $R_6$ represent, independently of each other, hydrogen atoms, halogen atoms, preferably chlorine or bromine atoms, alkyl or alkoxy groups of preferably 1 to 4 carbon atoms, the said radical C may be substituted by halogen atoms, preferably chlorine or bromine atoms, or alkyl or alkoxy groups of preferably 1 to 4 carbon atoms, $R_1$ represents a straight chain or branched alkyl-carbonyl radical or an aryl-carbonyl group which may be substituted by alkyl or alkoxy groups of 1 to 4 carbon atoms or by halogen atoms, preferably chlorine or bromine atoms, $R_1$ containing at most 18 carbon atoms, and $R_2$ has the same meaning as $R_1$ or represents the grouping of the formula (4)

$$R_1 - O - X - \quad (4)$$

in which $R_1$ has the meaning given above, and X represents a straight chain or branched alkylene group of 2 to 4 carbon atoms, and subsequently fixing the dyestuffs by a heat treatment.

The dyestuffs which are preferably used in the process of the invention are those which correspond to the general formula (5)

$$R_2' - O - A - N = N - B - N = -C - O - R_1' \quad (5)$$

in which A, B and C have the meanings given above, $R_1'$ represents an alkyl-carbonyl radical of 5 to 10 carbon atoms and $R_2'$ has the same meaning as $R_1'$ or represents the grouping of the formula (6)

$$R_1' - O - X - \quad (6)$$

in which X represents a straight chain or branched alkylene radical of 2 to 4 carbon atoms.

The dyestuffs which are most preferably used in the process of the invention are those which correspond to the general formula (7)

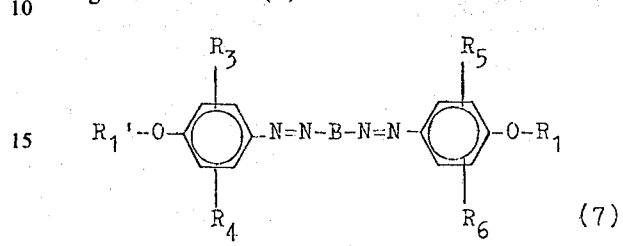

(7)

in which B, $R_1'$, $R_3$, $R_4$, $R_5$ and $R_6$ have the meanings given above.

With the aid of the dyestuffs used according to the process of the invention it is possible in the dyeing of synthetic fibrous materials from organic solvents to obtain dyeings which are distinguished by a high tinctorial yield, very good build-up and outstanding fastness properties, in particular very good fastness to thermosetting, to washing, to rubbing and to light. Another advantage of the dyestuffs used according to the invention is their high solubility in organic solvents, for example alcohols and in particular halogenated hydrocarbons, which in some cases permits dyeing without the use of solubilizers.

The dyestuffs used according to the invention are better suitable for the dyeing from organic solvents than the phenolic starting dyestuffs of the general formula (1), in which $R_1 = R_2 = H$, in that they yield distinctly more intense dyeings. In addition, the dyeings produced with the dyestuffs used according to the invention often have a better fastness to sublimation and show a clearer and brighter shade than dyeings produced with the phenolic starting dyestuffs.

Mixtures of the dyestuffs used according to the invention sometimes give a better tinctorial yield than the individual dyestuffs themselves and in some cases also have a better solubility in the organic solvent used.

The synthetic fiber materials may be those made of high molecular polyamides, polyolefins, polyacrylonitriles, furthermore of polyurethanes, polyvinyl chlorides, polyvinyl acetates and cellulose —2½ acetate and cellulose-triacetate, in particular, however, those of high molecular polyesters such as polyethylene terephthalate. The above-mentioned textile materials may also be used in mixtures one with the other or in mixtures with natural fibers such as cellulose fibers or wool. The fiber materials may be present in any processing stages which are suitable for a continuous method of operation, for example in the form of cable, combed material, filaments, yarns, fabrics, knit fabrics or "non-woven" articles.

As organic solvents, there may be used those the boiling points of which under normal conditions are not higher than 150°C, for example aliphatic hydrocarbons such as the boiling limit benzines (DIN 51 631/I, 59), aliphatic halogenated hydrocarbons such as methylene chloride, dichloroethane, trichloroethane, tetrachloroethane, dichloro-fluoromethane, dichlorotetrafluoromethane and octafluorocyclobutane, aromatic hydrocarbons such as toluene and xylene, or aromatic halogenated hydrocarbons such as chlorobenzene and fluorobenzene. Particularly suitable are trichlorofluoromethane, 1,2,2-trichloro-1,1,2-trichloro-ethane, tetrachloroethylene, trichloroethylene and 1,1,1-trichloroethane.

Furthermore, there may be used as organic solvents alcohols, preferably aliphatic alcohols containing up to 4 carbon atoms. Mixtures of different solvents have proved advantageous. Thus, for example mixtures of halogenated aliphatic hydrocarbons and aliphatic alcohols are particularly suitable.

For preparing the padding liquors, the dyestuffs are dissolved in the solvent or mixture of solvents by stirring, if necessary with heating. The dyestuffs may be used in various forms, for example in the form without filler, in the form of a concentrated solution in one of the solvents used according to the invention or in a mixture of solvents used according to the invention or in the form of a preparation with the use of solvent-soluble auxiliary agents, for example oxalkylation products of fat alcohols, alkylene phenols, fatty acids and fatty acid amides.

The dyestuff solutions are applied in the easiest way by padding, but they can also be applied by other impregnation methods, for example spraying, nip-padding or immersion.

The impregnation is carried out preferably at room temperature, but it is also possible to operate at lower or elevated temperatures.

Prior to the fixation of the dyestuff, the textile material treated with the dyeing liquor is preferably dried, which may be effected, for example by hot air, by passing through an inert gas (such as nitrogen) or air or by the application of super-heated vapours, for example steam or solvent vapour, or under application of reduced pressure.

The dyestuffs are then fixed by the application of elevated temperatures, for example by hot air, dry heat, steam or solvent vapour.

The fixing temperatures depend on the type of the fibers and are in general between 100° and 240° C in padding processes. The heat treatment can be effected in superheated steam or in vapours of organic solvents. The fixation may also be effected by molten metals, paraffins, waxes, oxalkylation products of alcohols or fatty acids or in eutectic mixtures of salts. It is preferred, however, to carry out the fixation by dry heat, i.e. according to the so-called thermosol process. It is also possible to carry out drying and heat treatment in one working step.

The solvent vapours obtained during drying or fixing are generally recovered by suitable installations. The recovered solvents may then be used again for the described dyeing process.

If necessary, the unfixed dyestuff proportion is removed after fixation of the dyestuffs, if necessary, by a suitable after-treatment, whereby the fastness properties regarding utilization may be improved. This after-treatment is preferably carried out in the same organic solvent used for dyeing, but it may also be effected in other organic solvents or in aqueous liquors according to known methods.

The dyestuffs of the mentioned formula (1) used according to the invention are new and may be prepared according to known methods by reacting known phenolic dis- or tris-azo dyestuffs of the mentioned formula (1), in which, however, $R_1$ and $R_2$ each represent a hydrogen atom, in a suitable medium, for example chloroform, benzene, methyl-ethyl ketone, dioxane or Sulfolan, with aliphatic or aromatic acid chlorides or anhydrides in the presence of an acid-binding agent, for example soda, pyridine or triethylamine.

The following Examples illustrate the invention.

EXAMPLE 1

6 Parts by weight of the dyestuff of the formula

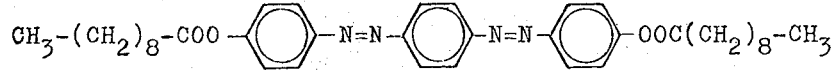

were dissolved at about 20° C in 1000 parts by volume of perchloroethylene. With this dyestuff solution a fabric of polyester fibers was padded on a foulard at room temperatures with a squeezing effect of about 70% (weight of the padding liquor referred to the weight of the fabric). The fabric was then dried in a suitable apparatus by removing the solvent vapours by suction. In order to fix the dyestuff, the fabric was thermosoled for 1 minute at 220° C. An orange dyeing having good fastness properties regarding utilization was obtained. Similar results were obtained when using instead of the above-mentioned solvent the same amount of trichloroethylene.

The dyestuff had been prepared as follows:

15.9 g (0.05 mole) of the dyestuff of the formula

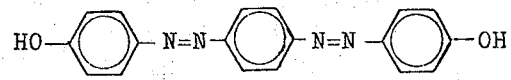

28.5 g (0.15 mole) of capric acid chloride and 11.9 g (0.15 mole) of pyridine were heated for about 8 hours under reflux to the boiling temperature in 300 ml of methylethyl ketone. When the reaction was completed, the dyestuff was precipitated from the organic medium by the addition of water. The dyestuff was filtered off with suction, washed with water and dried at about 50° C in a vacuum drier.

EXAMPLE 2

7 Parts by weight of the dyestuff of the formula

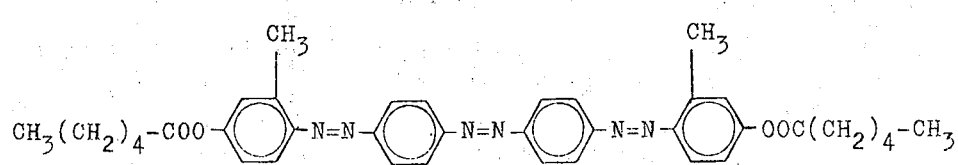

were dissolved at about 25° C in 1000 parts by volume of 1,1,1-trichloro-ethane. With this padding liquor, a mixed fabric of 67 % of polyester fibers and 33 % of cotton was padded on a foulard with a squeezing effect of about 85 %. Drying and fixation of the dyestuff was carried out as described in Example 1. The dyeing was subsequently washed cold for 2 minutes in 1,1,1-trichloro-ethane. A fast orange dyeing was obtained on the polyester portion of the mixed fabric.

The dyestuff had been prepared as follows:
22.5 g (0.05 mole) of the dyestuff of the formula

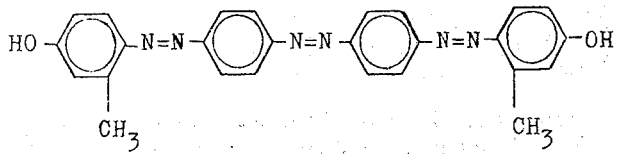

20.1 g (0.15 mole) of caproic acid chloride and 11.9 g (0.15 mole) of pyridine were heated for about 8 hours under reflux to the boiling temperature in 150 ml of chloroform and 150 ml of methylethyl-ketone. When the reaction was completed, the organic solvent was completely removed by evaporation. The residue was dissolved in a mixture of ethanol and acetone. The dyestuff was precipitated by slowly and dropwise adding ice-water, filtered off with suction, washed with water and dried at about 50° C in a vacuum drier.

EXAMPLE 3

4 Parts by weight of the dyestuff of the formula

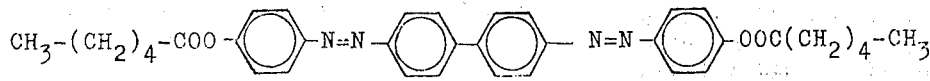

were dissolved at about 30° C in 1000 parts by volume of a mixture of 90% by volume of 1,2,2-trifluoro-trichloro-ethane and 10% by volume of methanol. With this liquor, a fabric of polyester fibers was padded on a foulard. The squeezing effect was about 65 %. Drying and dyestuff fixation was carried aout as described in Example 1. The dyeing was then washed cold in the same solvent mixture for about 5 minutes. A fast yellow dyeing was obtained.

The dyestuff had been prepared by acylating the dyestuff of the formula

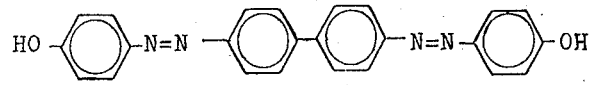

with caproic acid chloride as the acylating agent and further proceeding as described in Example 1.

EXAMPLE 4

6 Parts by weight of the dyestuff used in Example 1 were dissolved at room temperature in 1000 parts by volume of perchloroethylene and applied by padding as described in Example 1 on the following fibrous materials, dried and thermosoled under the indicated conditions:

| | |
|---|---|
| fabric of 2 ½-acetate fibers | 30 seconds at 160° C |
| fabric of triacetate fibers | 30 seconds at 170° C |
| fabric of polyamide-6,6 fibers | 40 seconds at 190° C |
| yarn of polyvinyl chloride fibers (type Thermovyl) | 30 seconds at 130° C |
| combed material of polypropylene fibers | 30 seconds at 145° C. |

The dyeings were subsequently washed cold for 5 minutes with perchloroethylene. Dependent on the fiber material used, fast yellow orange to brown orange dyeings were obtained.

EXAMPLE 5

3 Parts by weight of the dyestuff of the formula

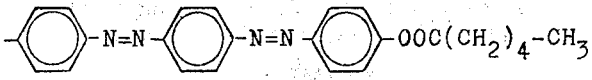

were dissolved at about 30° C in 1000 parts by volume of methanol. With this padding liquor, a fabric of polyester staple fibers was padded on a foulard with a squeezing effect of about 35 %, dried and thermosoled for 1 minute at 210° C. The dyeing was then washed cold for 5 minutes with methanol. An orange dyeing having good properties of fastness was obtained.

The dyestuff had been prepared as follows:
15.90 g (0.05 mole) of the dyestuff of the formula

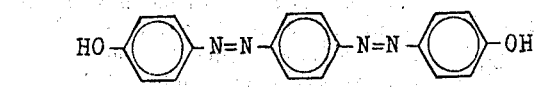

were dissolved in 250 ml of methylethyl-ketone and combined with 8.0 g (0.075 mole) of soda. 20.1 g (0.15 mole) of caproic acid chloride were added dropwise, while well cooling externally. The reaction mixture was heated for about 12 hours under reflux to the boiling temperature. When the reaction was completed, the organic solvent was completely removed by evaporation, and the residue was dissolved in a mixture of ethanol and acetone. The dyestuff was precipitated from the dyestuff solution by the addition of ice-water. The product was filtered off with suction, washed with water and dried at about 50° C in a vacuum drier.

EXAMPLE 6

8 Parts by weight of the dyestuff of the formula

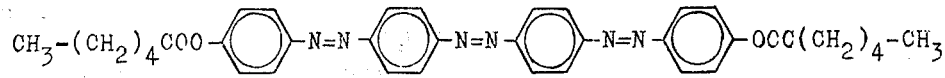

were dissolved in 1000 parts by volume of a mixture of 50 % of 1,2,2-trifluoro-trichloroethane and 50 % of methylene chloride at room temperature. With this solution, a fabric of polyester fibers was padded on a foulard with a squeezing effect of about 65 %, dried and thermosoled for 1 minute at 210° C. The dyeing was then washed cold for about 5 minutes in the same solvent mixture. A fast orange dyeing was obtained.

Similar results were obtained when using, instead of the hot air treatment, the following methods for the dyestuff fixation:

20 minutes steaming in steam at 102° – 103° C;
5 minutes steaming in superheated perchloroethylene vapour at about 150° C.

The dyestuff had been prepared by reacting the dyestuff of the formula

with caproic acid chloride as the acylating agent and further proceeding as described in Example 2.

EXAMPLE 7

3 Parts by weight of the dyestuff of the formula

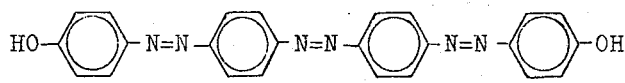

present in the form of a mixture of mono- and diacylation products, were dissolved at about 25° C in 1000 parts by volume of a mixture of 70 % of perchloroethylene and 30 parts by volume of methanol. With this solution, a fabric of polyester fibers was impregnated on a foulard. The squeezing effect was about 60 %. After padding, the dyeing was dried, subsequently thermosoled for 1 minute at 210° C and then washed cold for about 5 minutes in the same solvent mixture. A yellow orange dyeing having good properties of fastness was obtained.

The dyestuff had been prepared as follows:
32 g (0.1 mole) of the dyestuff of the formula

were dispersed in 350 ml of chloroform and combined with 23.7 g (0.3 mole) of pyridine. 32.4 g (0.3 mole) of trimethylacetic acid chloride (0.3 mole) were added slowly, while cooling externally. The reaction mixture was then heated for about 8 hours under reflux to the boiling temperature. Isolation of the dyestuff was effected in the manner described in the preceding examples.

EXAMPLE 8

4 Parts by weight of the dyestuff of the formula

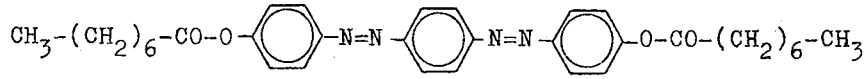

were dissolved at about 20° C in a mixture of 950 cc. of methylene chloride and 50 cc. of methanol. With this liquor, combed material of polyester fibers was padded on a foulard with a squeezing effect of about 72 %, dried and, in order to fix the dyestuff, thermosoled for 1 minute at 210° C. The dyeing was further treated by cold washing for 5 minutes with perchloroethylene. A fast yellow orange dyeing was obtained.

The dyestuff had been prepared as follows:
32 g (0.1 mole) of the dyestuff of the formula

were dispersed in 350 ml of chloroform and combined with 23.7 g (0.3 mole) of pyridine. 48.6 g (0.3 mole) of caprylic acid chloride were added slowly, while cooling externally. After having heated for 8 hours, reaction had taken place to a large extent. The dyestuff was then isolated in the manner described above.

The following Table indicates further dyestuffs which were used and prepared in the manner described in the preceding Examples. They yielded very fast dyeings on polyester fibers in the indicated shades.

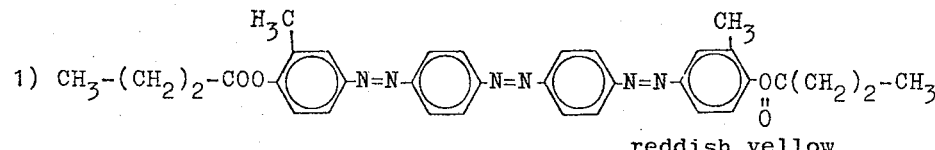

reddish yellow

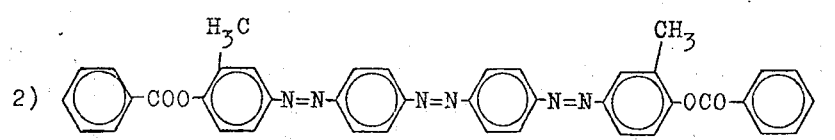

reddish yellow

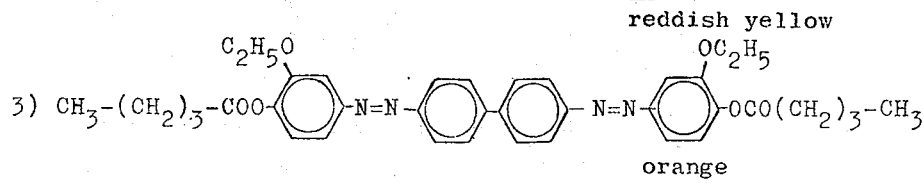

orange

4) 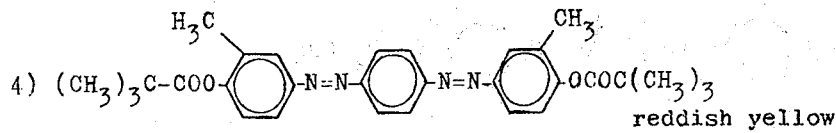
reddish yellow
5) 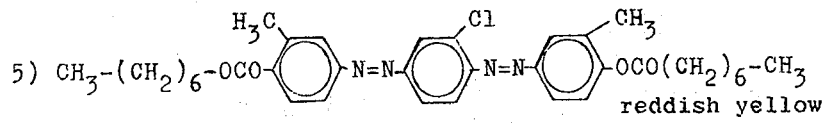
reddish yellow
6) 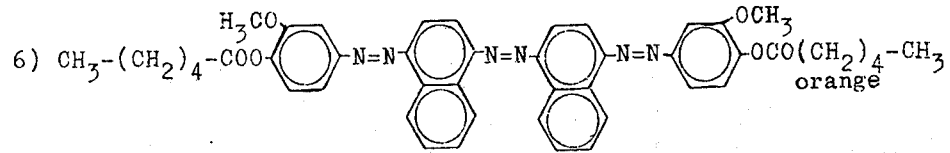
orange
7) 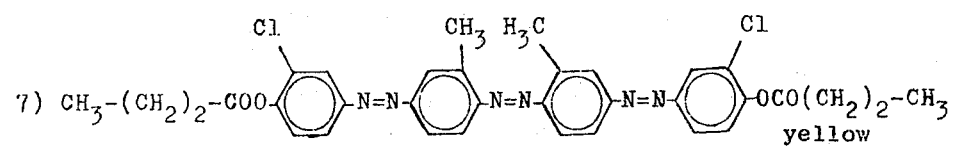
yellow
8) 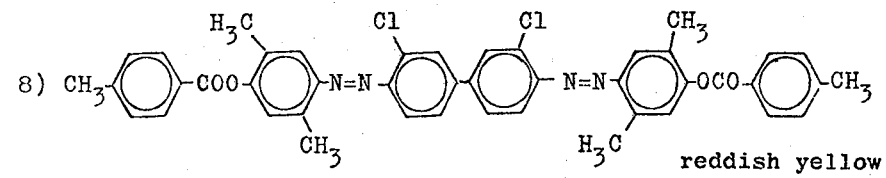
reddish yellow
9) 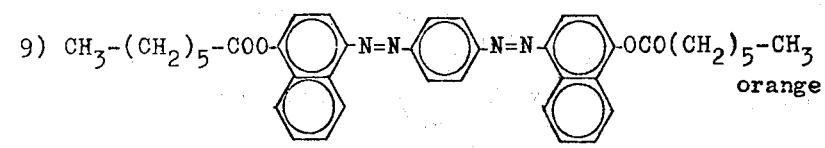
orange
10) 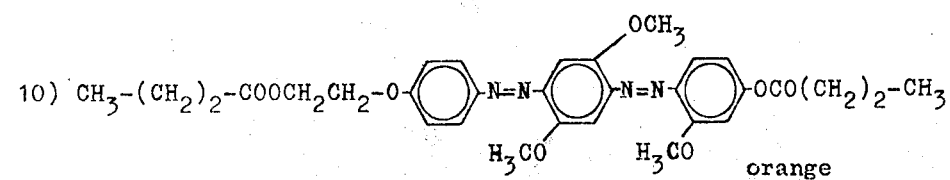
orange
11) 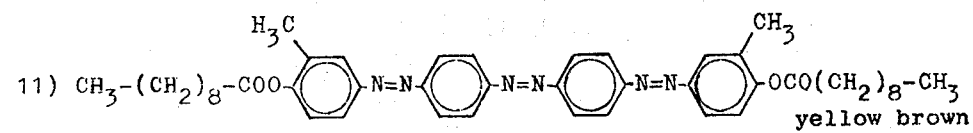
yellow brown
12) 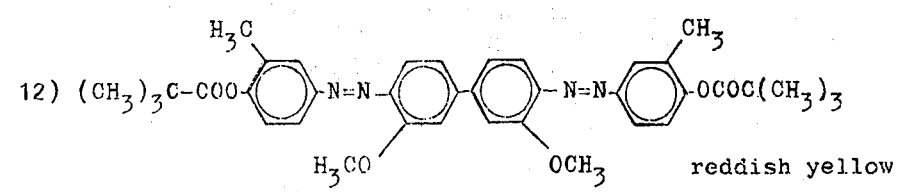
reddish yellow
13) 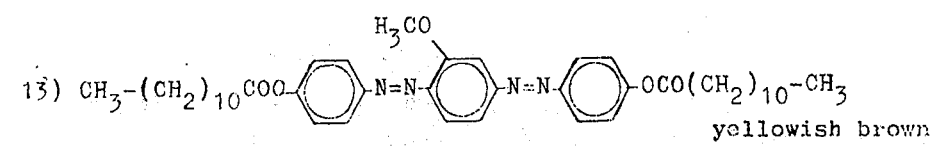
yellowish brown 14) 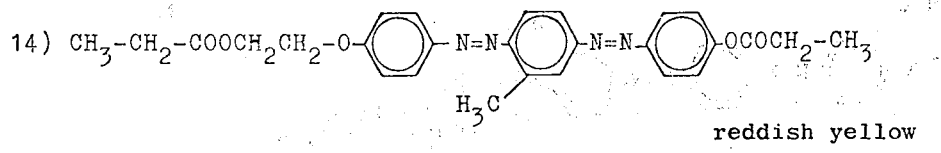
reddish yellow
15) 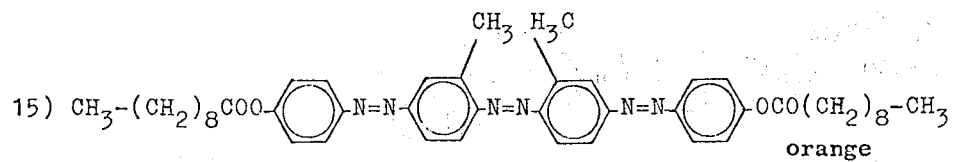
orange
16) 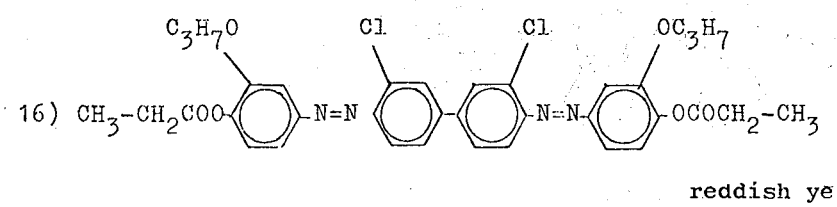
reddish yellow
17) 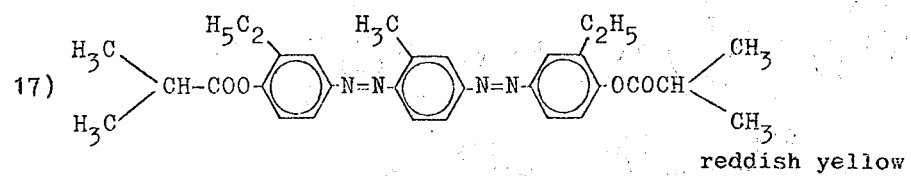
reddish yellow
18) 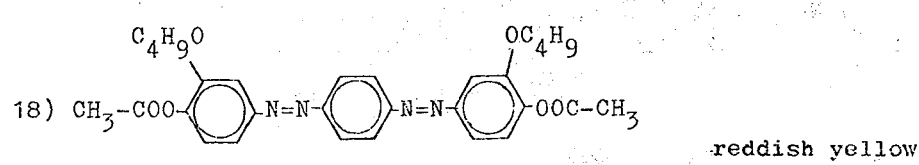
reddish yellow
19) 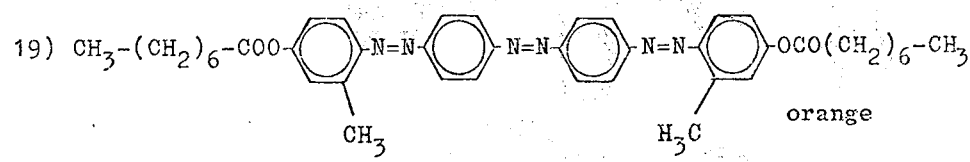
orange
20) 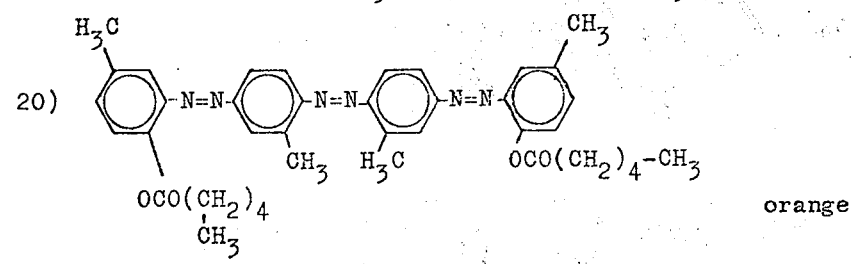
orange
21) 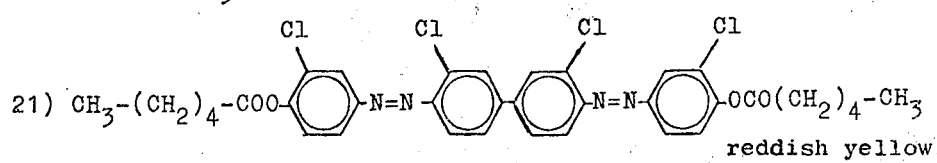
reddish yellow
22) 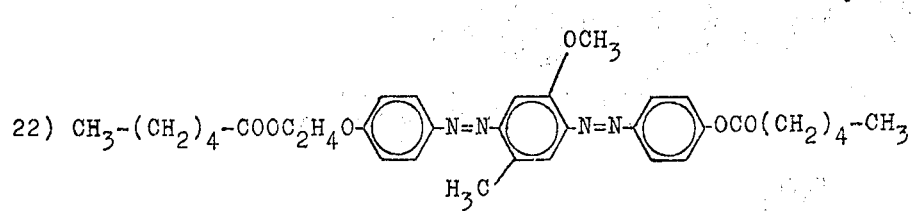
reddish yellow
23) 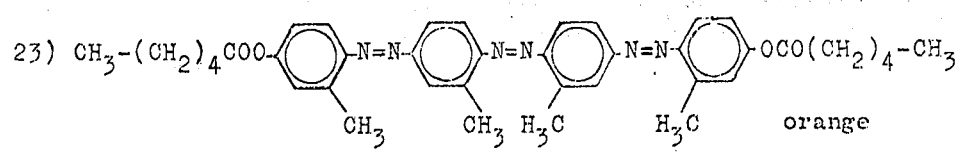
orange

We claim:

1. A process for the continuous dyeing of textile material containing or consisting of synthetic fibers from organic solvents, which comprises impregnating the said textile materials with an organic dyebath containing at least one dyestuff of the formula $$R_2O - A_1 - N = N - Y - N = N - A_2 - OR_1$$

in which $A_1$ and $A_2$ each represent, independently of each other, phenylene, lower alkyl-phenylene, lower alkoxy-phenylene, chlorophenylene, bromophenylene or naphthylene, Y represents phenylene, lower alkyl-phenylene, lower alkoxy-phenylene, di(lower alkyl)-phenylene, di(lower alkoxy)-phenylene, lower alkyl-lower alkoxy-phenylene, chlorophenylene, bromophenylene, biphenylene, di(lower alkyl)-biphenylene, di(lower alkoxy)-bi-phenylene, di(chloro)-biphenylene or di(bromo)-biphenylene, $R_1$ represents a straight chain or branched alkylcarbonyl of at most 18 carbon atoms, benzoyl, lower alkyl-benzoyl, chlorobenzoyl or bromobenzoyl, and $R_2$ represents a straight chain or branched alkylcarbonyl of at most 18 carbon atoms, benzoyl, lower alkyl-benzoyl, chlorobenzoyl, bromobenzoyl or lower alkyl

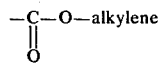

(of 2 to 4 carbon atoms, and an organic solvent and subsequently fixing the dyestuffs by a heat treatment.

2. The process as claimed in claim 1, wherein at least one halogenated hydrocarbon is used as organic solvent.

3. The process as claimed in claim 1, wherein at least one aliphatic alcohol is used as organic solvent.

4. The process as claimed in claim 1, wherein a mixture consisting of a halogenated organic hydrocarbon and an aliphatic alcohol is used as organic solvent.

5. The process as claimed in claim 1, wherein the boiling limit benzines, methylene chloride, dichloroethane, trichloroethane, tetrachloroethane, dichlorofluoromethane, dichlorotetrafluoromethane, octafluoro-cyclobutane, toluene, xylene, chlorobenzene, fluorobenzene, trichloro-fluoromethane, 1,2,2-trichloro-1,1,2-trichloroethane, tetrachloroethylene, trichloroethylene and 1,1,1-trichloroethane are used as organic solvent.

6. The process as claimed in claim 1, wherein the dyeing is aftertreated in an organic solvent.

7. The process as claimed in claim 1, wherein the dyeing is aftertreated in the same organic solvent or mixture of organic solvents which had been used in the preceding dyeing process.

8. The process as claimed in claim 1, wherein textile material consisting of polyamides, polyurethanes, polyolefins, polyacrylonitriles, polyvinyl chlorides, polyvinyl acetates, cellulose-2½-acetate, cellulose-triacetate or polyester is dyed.

* * * * *